(12) United States Patent
Wu et al.

(10) Patent No.: US 12,501,292 B2
(45) Date of Patent: Dec. 16, 2025

(54) MEASUREMENT METHOD, MEASUREMENT INDICATION METHOD, AND DEVICE

(71) Applicant: VIVO MOBILE COMMUNICATION CO., LTD., Guangdong (CN)

(72) Inventors: Kai Wu, Guangdong (CN); Li Chen, Guangdong (CN); Yanliang Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 470 days.

(21) Appl. No.: 17/588,676

(22) Filed: Jan. 31, 2022

(65) Prior Publication Data
US 2022/0159492 A1 May 19, 2022

Related U.S. Application Data

(63) Continuation of application No. PCT/CN2020/105192, filed on Jul. 28, 2020.

(30) Foreign Application Priority Data

Aug. 2, 2019 (CN) .......................... 201910713815.7

(51) Int. Cl.
*H04W 56/00* (2009.01)
*H04L 41/0896* (2022.01)
(Continued)

(52) U.S. Cl.
CPC ......... *H04W 24/08* (2013.01); *H04L 41/0896* (2013.01); *H04W 28/20* (2013.01); *H04W 56/001* (2013.01); *H04B 17/328* (2023.05)

(58) Field of Classification Search
CPC . H04W 56/001; H04W 56/002; H04W 24/08; H04W 28/20; H04W 48/16;
(Continued)

(56) References Cited

U.S. PATENT DOCUMENTS

2019/0052379 A1 2/2019 Lin et al.
2019/0074886 A1 3/2019 Yoon et al.
(Continued)

FOREIGN PATENT DOCUMENTS

CN 109891819 A 6/2019
CN 110022191 A 7/2019
(Continued)

OTHER PUBLICATIONS

ETSI, "TS 138 101-4 V15.0.0", Apr. 2019, pp. 1-188 (Year: 2019).*
(Continued)

*Primary Examiner* — Salvador E Rivas
(74) *Attorney, Agent, or Firm* — Price Heneveld LLP

(57) ABSTRACT

Embodiments of the present disclosure provide a measurement method, a measurement indication method, and a device. The method includes receiving indication information, where the indication information indicates whether a terminal can perform measurement at one or more second SSBs, a frequency position of the second SSB is different from a frequency position of a first SSB, and the first SSB is an SSB for measurement of a serving cell. In the embodiments of the present disclosure, the terminal may perform RRM measurement at a non-cell defining SSB in a BWP at which downlink reception is currently performed, which reduces interruption of data transmission, and improves flexibility of measurement behavior of the terminal.

19 Claims, 4 Drawing Sheets

(51) Int. Cl.
*H04W 24/08* (2009.01)
*H04W 28/20* (2009.01)
*H04B 17/318* (2015.01)

(58) Field of Classification Search
CPC ..... H04W 72/20; H04W 72/23; H04J 3/0638; H04B 17/328; H04L 41/0896
See application file for complete search history.

(56) References Cited

U.S. PATENT DOCUMENTS

| | | | |
|---|---|---|---|
| 2019/0215743 A1 | 7/2019 | Liu et al. | |
| 2019/0230550 A1 | 7/2019 | Yiu | |
| 2019/0297514 A1* | 9/2019 | Pao | H04W 24/08 |
| 2019/0387547 A1* | 12/2019 | Shin | H04W 48/12 |
| 2020/0205102 A1* | 6/2020 | Islam | H04J 72/0446 |
| 2020/0266958 A1* | 8/2020 | Liu | H04W 16/12 |
| 2020/0344019 A1* | 10/2020 | Da Silva | H04W 24/04 |
| 2020/0396628 A1* | 12/2020 | Kim | H04W 24/08 |
| 2020/0404537 A1* | 12/2020 | Harada | H04W 48/10 |
| 2021/0084511 A1 | 3/2021 | Harada | |
| 2021/0175985 A1* | 6/2021 | Yoon | H04W 56/00 |
| 2021/0227409 A1* | 7/2021 | Siomina | H04W 72/542 |
| 2021/0321349 A1* | 10/2021 | Tang | H04L 5/0051 |
| 2021/0345201 A1* | 11/2021 | Cheng | H04W 24/10 |
| 2023/0146103 A1* | 5/2023 | Cheng | H04L 5/0048 370/252 |
| 2023/0239121 A1* | 7/2023 | Futaki | H04L 5/001 370/329 |

FOREIGN PATENT DOCUMENTS

| | | |
|---|---|---|
| CN | 110036593 A | 7/2019 |
| WO | 2018227631 A1 | 12/2018 |
| WO | 2019107969 A1 | 6/2019 |
| WO | 2019138500 A1 | 7/2019 |

OTHER PUBLICATIONS

CATT, "Discussion on applicability for intra-frequency measurement", 3GPP TSG-RAN WG4 #84bis Meeting, R4-1710470, Dubrovnik, Croatia, Oct. 9-13, 2017.

ZTE, "Introducing per BWP SSB configuration", 3GPP TSG-RAN WG2 Meeting #101bis, R2-1804374, Sanya, China, Apr. 16-20, 2018.

[91-NR-04] RSMI presence indication. LISTSERV 16.5-3GPP_TSG_RAN_WG1 Archives [online]. 2017 [retrieved on Oct. 22, 2020]. Retrieved from the Internet: <URL:https://list.etsi.org/scripts/wa.exe?A3=ind1712b&I=3GPP_TSG_RAN_WG1&E=base64&P=-_30278211&B=-_000_VI1PR0701MB2800AC7A8E.

Intel Corporation, "Summary of Offline Discussion for NR Radio Link Monitoring", 3GPP TSG RAN WG1 Meeting #93, R1-1807740, Busan, South Korea, May 21-25, 2018.

VIVO, "Remaining aspects on NR-PBCH", 3GPP TSG RAN WG1 Meeting #92, R1-1801507, Greece, Athens, Feb. 26-Mar. 2, 2018.

* cited by examiner

MEASUREMENT METHOD, MEASUREMENT INDICATION METHOD, AND DEVICE

CROSS-REFERENCE TO RELATED APPLICATION

This application is a continuation application of International Application No. PCT/CN2020/105192 filed on Jul. 28, 2020, which claims priority to Chinese Patent Application No. 201910713815.7 filed in China on Aug. 2, 2019, which are incorporated herein by reference in their entireties.

TECHNICAL FIELD

Embodiments of the present disclosure relate to the field of communications technologies, and specifically, to a measurement method, a measurement indication method, and a device.

BACKGROUND

In a case that a bandwidth of a downlink activated bandwidth part (Bandwidth part, BWP) received by a user equipment (UE) does not include a cell defining Synchronization Signal and PBCH block (SSB) of a terminal (for example, a UE), the terminal fails to perform measurement at a current BWP, and needs to jump to a frequency of an SSB for measurement. This causes frequent retuning of a receiving frequency of the terminal, resulting in discontinuous downlink reception.

SUMMARY

An objective of embodiments of the present disclosure is to provide a measurement method, a measurement indication method, and a device.

According to a first aspect of the embodiments of the present disclosure, a measurement method is provided. The measurement method is applied to a terminal and includes:
receiving, by terminal, indication information, where the indication information indicates whether the terminal can perform measurement at one or more second SSBs, where
a frequency position of the second SSB is different from a frequency position of a first SSB, and the first SSB is an SSB for measurement of a serving cell.

According to a second aspect of the embodiments of the present disclosure, a measurement indication method is further provided. The measurement indication method is applied to a network device and includes:
sending indication information, where the indication information indicates whether a terminal can perform measurement at one or more second SSBs, where
a frequency position of the second SSB is different from a frequency position of a first SSB, and the first SSB is an SSB for measurement of a serving cell.

According to a third aspect of the embodiments of the present disclosure, a terminal is further provided, including:
a first receiving module, configured to receive indication information, where the indication information indicates whether the terminal can perform measurement at one or more second SSBs, a frequency position of the second SSB is different from a frequency position of a first SSB, and the first SSB is an SSB for measurement of a serving cell.

According to a fourth aspect of the embodiments of the present disclosure, a network device is further provided, including: a second sending module, configured to send indication information, where the indication information indicates whether a terminal can perform measurement at one or more second SSBs, a frequency position of the second SSB is different from a frequency position of a first SSB, and the first SSB is an SSB for measurement of a serving cell.

According to a fifth aspect of the embodiments of the present disclosure, a terminal is further provided, including: a processor, a memory, and a program stored in the memory and executable by the processor. The program, when executed by the processor, implements the steps of the foregoing measurement method.

According to a sixth aspect of the embodiments of the present disclosure, a network device is further provided, including: a processor, a memory, and a program stored in the memory and executable by the processor. The program, when executed by the processor, implements the steps of the foregoing measurement indication method.

According to a seventh aspect of the embodiments of the present disclosure, a computer-readable storage medium is further provided. The computer-readable storage medium stores a computer program. The computer program, when executed by a processor, implements the steps of the foregoing measurement method or the steps of the foregoing measurement indication method.

BRIEF DESCRIPTION OF DRAWINGS

It becomes clear for a person of ordinary skill in the art to learn various other advantages and benefits by reading detailed description of the following optional implementations. Accompanying drawings are merely used for showing the optional implementations, and are not considered as a limitation on the present disclosure. In addition, in all the accompanying drawings, same reference numerals are used to indicate the same component. In the accompanying drawings.

DETAILED DESCRIPTION OF EMBODIMENTS

Figure 1:
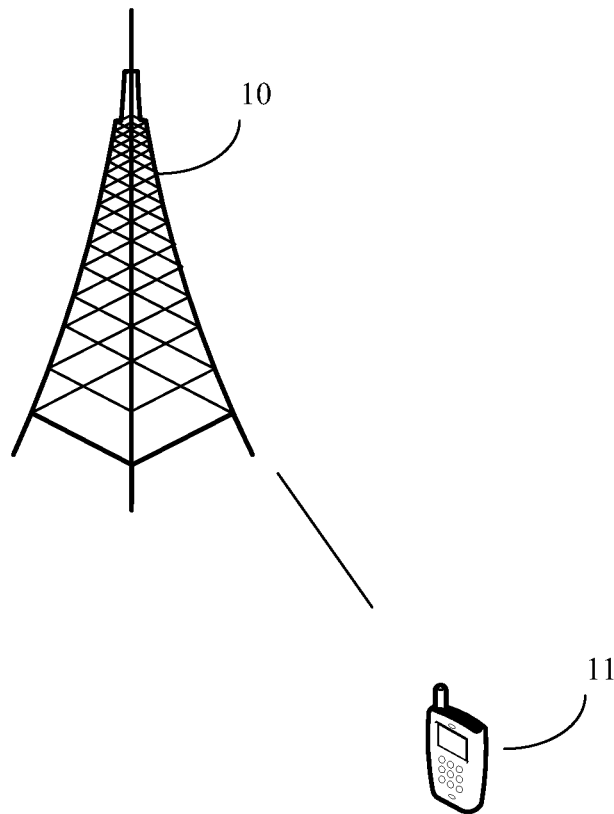
FIG. 1 is a schematic architectural diagram of a wireless communications system according to an embodiment of the present disclosure.

For ease of understanding the embodiments of the present disclosure, several technical points are first described:

(1) For a release-15 (Rel-15) UE, an SSB at which the UE performs SSB-based intra-frequency measurement is a cell defining SSB of a serving cell of the UE. At which a measurement SSB for link quality monitoring of a cell and a beam is also the cell defining SSB of the serving cell.

Further, the cell defining SSB is an SSB associated with remaining minimum system information (RMSI), and is on a synchronization raster.

(2) A network may send, on one carrier, a plurality of SSBs that are on the synchronization raster. All the SSBs are associated with the RMSI. Each SSB corresponds to one independent cell. Physical-layer cell IDs (for example, physical cell identifiers (PCI)) corresponding to these SSBs may be the same as or different from one another, but higher-layer cell indexes are different.

(3) For measurement of a second SSB at a frequency different from that of the cell defining SSB (or referred to as a first SSB) of the serving cell belongs to inter-frequency measurement. The inter-frequency measurement requires a measurement gap. In the measurement gap, the UE fails to perform other reception behavior different from measurement behavior.

(4) In a case that a network switches from a BWP including the cell defining SSB of the UE to a BWP that does not include the SSB but includes the second SSB, because the second SSB belongs to another cell, a result measured by definition belongs to measurement results of the another cell, but does not belong to measurement results of the serving cell. In a case that the UE returns to a position of the cell defining SSB for measurement, a frequency needs to be adjusted for reception, and reception of a currently activated downlink BWP is interrupted. In a case that the UE switches to the second SSB and uses the second SSB as a measurement SSB of the serving cell of the UE, a process of switching between inter-frequency cells needs to be performed, and the process is reflectively complex.

The network may use a same base station to transmit SSBs at different frequency positions of one carrier. Therefore, in this case, channel environments of the SSBs are similar, and another SSB may be used for RRM measurement.

However, a protocol in the related art does not support this measurement behavior. In the embodiments of the present disclosure, the network may deliver indication information, to indicate that the UE can use an SSB at another frequency position as an SSB for RRM measurement of the serving cell, which simplifies measurement and reception behavior of the UE.

The following clearly describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

The term "include" and any other variants in the specification and claims of the present disclosure are intended to cover a non-exclusive inclusion, for example, a process, method, system, product, or device that includes a list of steps or units is not necessarily limited to those expressly listed steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the term such as "exemplary" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

The technology described herein is not limited to a long time evolution (LTE)/LTE-Advanced (LTE-A) system, and can also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are often used interchangeably. The CDMA system can implement radio technologies such as CDMA2000 and universal terrestrial radio access (UTRA). UTRA includes wideband CDMA (WCDMA) and other CDMA variants. A TDMA system can implement radio technologies such as the global system for mobile communications (GSM). The OFDMA system can implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are parts of a universal mobile telecommunications system (UTMS). LTE and advanced LTE (for example, LTE-A) are new UMTS versions that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technology described in this specification can be used in the foregoing systems and radio technologies as well as other systems and radio technologies.

The embodiments of the present disclosure are described below with reference to the accompanying drawings. A measurement method, a measurement indication method, and a device provided in the embodiments of the present disclosure can be applied to a wireless communications system. FIG. 1 is a schematic architectural diagram of a wireless communications system according to an embodiment of the present disclosure. As shown in FIG. 1, the wireless communications system may include: a network device 10 and a terminal device. The terminal device may be denoted as a UE 11, and the UE 11 may communicate with the network device 10 (to transmit signaling or transmit data). In actual application, a connection between the devices may be a wireless connection. For ease of visually indicating a connection relationship between the devices, a solid line is used for illustration in FIG. 1. It should be noted that the foregoing communications system can include a plurality of UEs 11, and the network device 10 can communicate with the plurality of UEs 11.

The terminal device provided in the embodiments of the present disclosure may be a mobile phone, a tablet computer, a notebook computer, an ultra-mobile personal computer (UMPC), a netbook, a personal digital assistant (PDA), a mobile Internet device (MID), a wearable device, an in-vehicle device, or the like.

The network device 10 provided in the embodiments of the present disclosure may be a base station. The base station may be a commonly used base station, or may be an evolved nodeB (eNB), or may be a device such as a network device (for example, a next generation nodeB (gNB) or a transmission and reception point (TRP)) in a 5G system.

Figure 2:
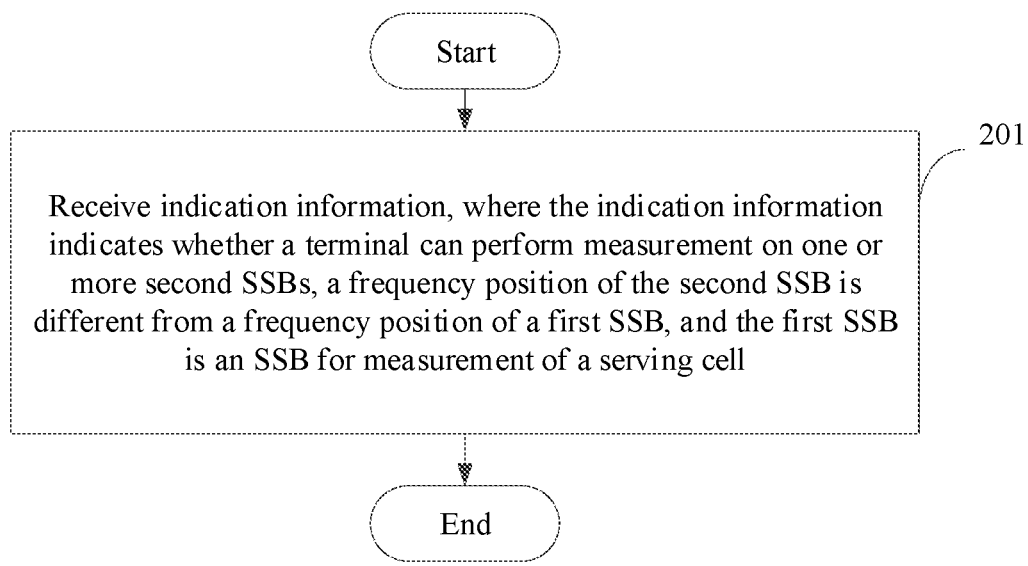
FIG. 2 is a first flowchart of a measurement method according to an embodiment of the present disclosure.

Referring to FIG. 2, an embodiment of the present disclosure provides a measurement method. The method is performed by a terminal and specifically includes step 201.

Step 201: receive indication information, where the indication information indicates whether the terminal can perform measurement at one or more second SSBs, a frequency position of the second SSB is different from a frequency position of a first SSB, and the first SSB is an SSB for measurement of a serving cell, for example, a cell defining SSB of the serving cell. The cell defining SSB is an SSB associated with RMSI.

It may be understood that, the first SSB and the second SSB are sent from a same network device Channel environments of the first SSB and the second SSB are basically the same. It can be considered that quality of a cell link can be reflected by using a measurement result of any SSB.

It may be understood that the indication information may explicitly or implicitly indicate whether the terminal can perform the measurement on the one or more second SSBs.

In some implementations, the indication information includes a quasi co-located (QCL) relationship between the second SSB and the first SSB. The QCL relationship between the second SSB and the first SSB implicitly indicates that the terminal can perform the measurement on the one or more second SSBs.

In some implementations, the indication information is received via higher layer signaling, a first medium access control layer-control element (MAC-CE), or first downlink control information (DCI). Further, the first DCI is DCI indicating that the terminal switches between BWPs; and/or the first MAC-CE is an MAC-CE indicating an activated secondary cell (Scell) of the terminal.

In some implementations, the measurement on the one or more second SSBs includes: measurement of a serving cell on the one or more second SSBs, or intra-frequency measurement on the one or more second SSBs.

In some implementations, the measurement of the serving cell includes one or more of the following:
(1) RRM measurement of the serving cell;
(2) layer 1-reference signal received power (L1-RSRP) measurement of the serving cell; and
(3) measurement for radio link monitoring for a cell or beam of the serving cell.

In some implementations, the intra-frequency measurement includes one or more of the following:
(1) RRM measurement of the serving cell;
(2) cell searching or discovery; and
(3) RRM measurement of a non-serving cell.

In some implementations, measurement configuration of the second SSB is the same as measurement configuration of the first SSB. In other words, in the embodiments of the present disclosure, there may be no explicit configuration of the second SSB. When the terminal receives the indication information, it is assumed that the configuration of the second SSB is the same as the configuration of the first SSB.

In some implementations, before or after step 201, the method may further include:
receiving measurement configuration of the second SSB, for example, receiving the measurement configuration of the second SSB via higher layer signaling; receiving the measurement configuration of the second SSB via a second MAC-CE; or receiving the measurement configuration of the second SSB via second DCI.

Further, the second DCI is DCI indicating that the terminal switches between BWPs; and/or the second MAC-CE is an MAC-CE indicating an activated Scell of the terminal.

In some implementations, the measurement configuration of the second SSB may include one or more of the following:
(1) SSB-based RRM measurement timing configuration (SMTC);
(2) SSB index (index) configuration for transmitting an SSB; and
(3) SSB power configuration.

In some implementations, the measurement configuration of the second SSB includes one or more of the following:
(1) an SSB index for detecting link quality;
(2) a measurement period;
(3) a parameter of a timer or counter for radio link failure, for example, the counter is an n310 or n311 counter, and the timer is a T310 or T311 timer; and
(4) a parameter of a counter or timer for beam failure detection.

In some implementations, in a case that the second SSB is within the BWP of the terminal, where the indication information indicates whether the terminal can perform the measurement on the one or more second SSBs.

In some implementations, after step 201, the method further includes:
in a case that the activated BWP of the terminal includes the first SSB and the second SSB, performing the measurement at the frequency position of the first SSB and the frequency position of the second SSB respectively, to obtain a first measured value and a second measured value; and
performing filtering on the first measured value and the second measured value, to obtain a joint measured value. The filtering is weighted summation performed on the first measured value and the second measured value, for example, the first measured value and the second measured value are averaged, to obtain a joint measured value.

In some implementations, after step 201, the method further includes:
in a case that the indication information indicates that the terminal can perform the measurement on the one or more second SSBs, switching, by the terminal, to the frequency position of the second SSB for the measurement.

In some implementations, after the switching, by the terminal, to the frequency position of the second SSB for the measurement, the method further includes:
in a case that the measurement includes the RRM measurement of the serving cell and/or the RRM measurement of the non-serving cell, performing one or more of the following:
(1) performing L3 filtering based on a measurement result of the second SSB and a measurement result of the first SSB, to obtain an L3-RRM measurement result; or
(2) discarding a measurement result of the first SSB, and performing L3 filtering based on a measurement result of the second SSB, to obtain an L3-RRM measurement result.

In some implementations, after the switching, by the terminal, to the frequency position of the second SSB for the measurement, the method further includes:

in a case that the measurement includes the measurement for the radio link monitoring for the cell or beam of the serving cell, performing one or more of the following:

(1) continuing using a currently running counter or timer; or (2) restarting a current counter or timer.

In some implementations, before or after step 201, the method further includes:

reporting a measurement capability of the terminal, where the measurement capability includes: a quantity of frequencies of SSBs at which RRM measurement is performed in a receiving bandwidth of the terminal, and/or a quantity of frequencies of SSBs at which cell searching is performed in the receiving bandwidth of the terminal.

In the embodiments of the present disclosure, the terminal may perform RRM measurement at a non-cell defining SSB in a BWP at which downlink reception is currently performed, which reduces interruption of data transmission, and improves flexibility of measurement behavior of the terminal.

Figure 3:
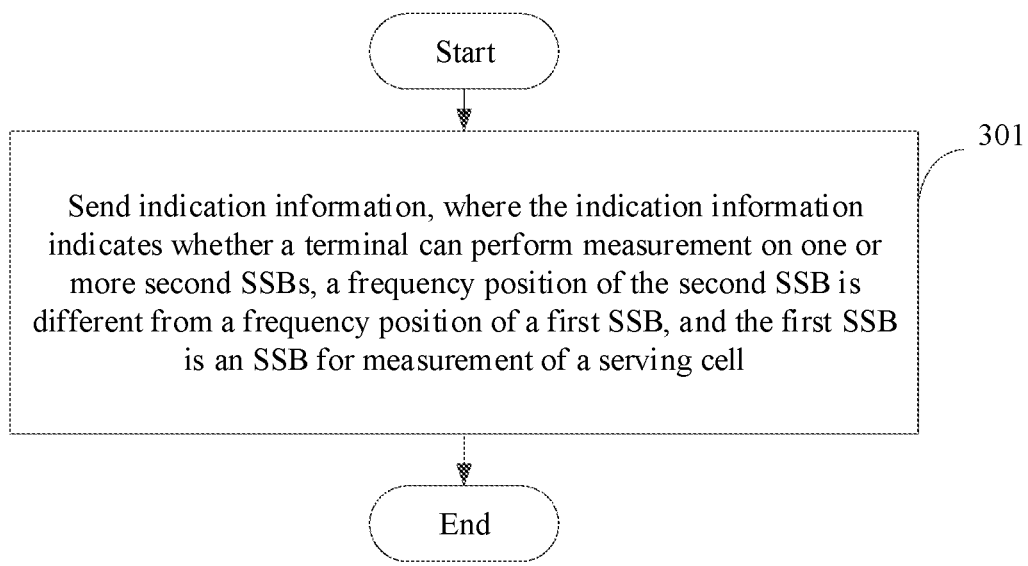
FIG. 3 is a second flowchart of a measurement indication method according to an embodiment of the present disclosure.
Figure 4:
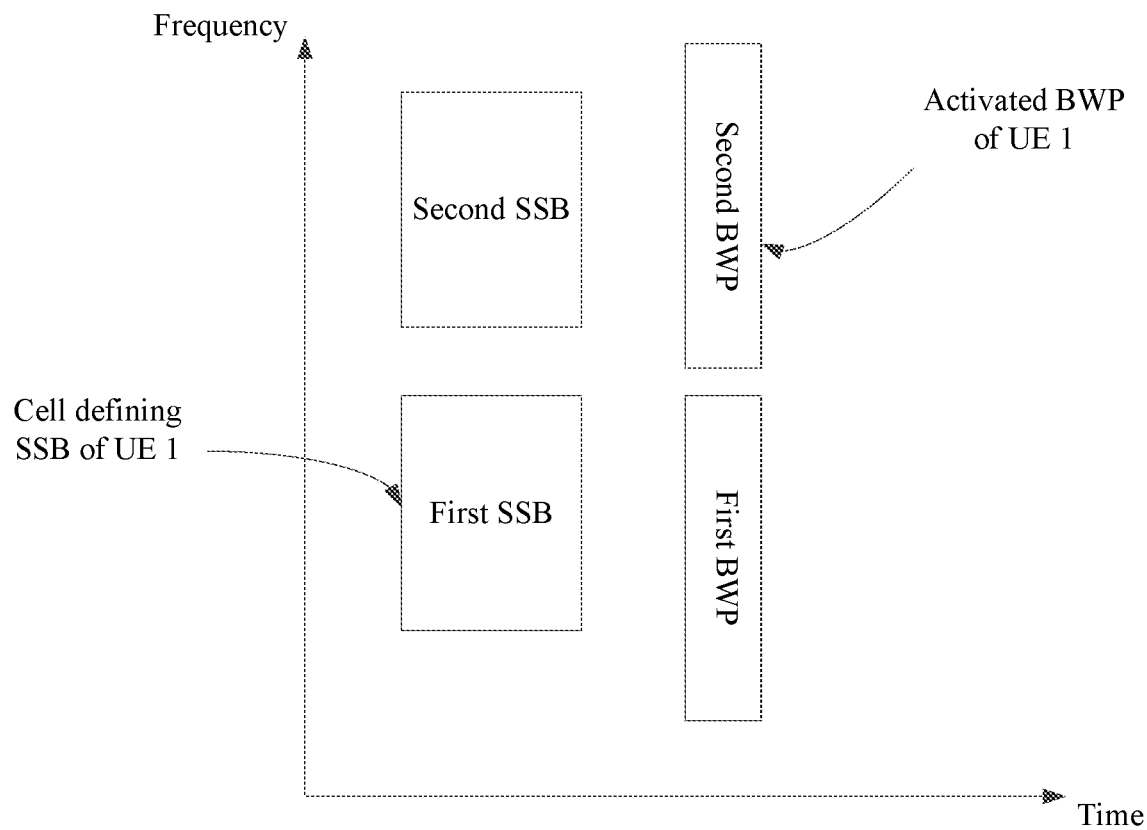
FIG. 4 is a schematic diagram of transmission at a first SSB and a second SSB.

Referring to FIG. 3, an embodiment of the present disclosure provides a measurement indication method. The method is performed by a network device and specifically includes step 301.

Step 301: Send indication information, where the indication information indicates whether a terminal can perform measurement at one or more second SSBs, a frequency position of the second SSB is different from a frequency position of a first SSB, and the first SSB is an SSB for measurement of a serving cell, for example, a cell defining SSB. Further, the cell defining SSB is an SSB associated with RMSI.

In some implementations, the indication information includes a QCL relationship between the second SSB and the first SSB. The QCL relationship between the second SSB and the first SSB implicitly indicates that the terminal can perform the measurement on the one or more second SSBs.

In some implementations, the indication information is sent via higher layer signaling, a first MAC-CE, or first DCI. Further, the first DCI is DCI indicating that the terminal switches between BWPs; and/or the first MAC-CE is an MAC-CE indicating an activated Scell of the terminal.

In some implementations, the measurement on the one or more second SSBs includes: measurement of a serving cell on the one or more second SSBs, or intra-frequency measurement on the one or more second SSBs.

In some implementations, the measurement of the serving cell includes one or more of the following:

(1) RRM measurement of the serving cell;

(2) layer 1-reference signal received power (L1-RSRP) measurement of the serving cell; and (3) measurement for radio link monitoring for a cell or beam of the serving cell.

In some implementations, the intra-frequency measurement includes one or more of the following:

(1) RRM measurement of the serving cell;

(2) cell searching or discovery; and (3) RRM measurement of a non-serving cell.

In some implementations, measurement configuration of the second SSB is the same as measurement configuration of the first SSB. In other words, in the embodiments of the present disclosure, there may be no explicit configuration of the second SSB. When the terminal receives the indication information, it is assumed that the configuration of the second SSB is the same as the configuration of the first SSB.

In some implementations, before or after step 301, the method further includes:

sending measurement configuration of the second SSB, for example, sending the measurement configuration of the second SSB via higher layer signaling; sending the measurement configuration of the second SSB via a second MAC-CE; or sending the measurement configuration of the second SSB via second DCI. Further, the second DCI is DCI indicating that the terminal switches between BWPs; and/or the second MAC-CE is an MAC-CE indicating an activated Scell of the terminal.

In some implementations, the measurement configuration of the second SSB may include one or more of the following:

(1) SMTC;

(2) SSB index configuration for transmitting an SSB; and (3) SSB power configuration.

In some implementations, the measurement configuration of the second SSB includes one or more of the following:

(1) an SSB index for detecting link quality;

(2) a measurement period;

(3) a parameter of a timer or counter for radio link failure; and (4) a parameter of a counter or timer for beam failure detection.

In some implementations, in a case that the second SSB is within the BWP of the terminal, where the indication information indicates whether the terminal can perform the measurement on the one or more second SSBs.

In some implementations, before or after step 301, the method further includes:

receiving a measurement capability of the terminal, where the measurement capability includes: a quantity of frequencies of SSBs at which RRM measurement is performed in a receiving bandwidth of the terminal, and/or a quantity of frequencies of SSBs at which cell searching is performed in the receiving bandwidth of the terminal.

In the embodiments of the present disclosure, the terminal may perform RRM measurement at a non-cell defining SSB in a BWP at which downlink reception is currently performed, which reduces interruption of data transmission, and improves flexibility of measurement behavior of the terminal.

A process of the measurement method described in embodiments 1 to 4 of the present disclosure is described below with reference to FIG. 3.

As shown in FIG. 3, transmission of a plurality of SSBs is performed on a carrier of a base station (next Generation Node B, gNB). In a case that UE #1 accesses to a network via reception of SSB 1 (or referred to as a first SSB or 1-st SSB) and RMSI associated with SSB 1, SSB 1 is a cell defining SSB of UE #1. A frequency position of SSB 2 (or referred to as a second SSB or 2-nd SSB) is different from a frequency position of SSB 1. Although SSB 2 is also associated with RMSI, SSB 2 is not a cell defining SSB of UE #1. SSB 1 and SSB 2 correspond to different cells. However, actually, the two SSBs are sent from a same base station Channel environments of the two SSBs are basically the same. It can be considered that quality of a cell link can be reflected by using a measurement result of any SSB.

In a case that the UE performs downlink reception at BWP 1 (or referred to as a first BWP or 1-st BWP), frequency retuning (retuning) does not need to be performed when the UE performs serving cell and neighboring cell measurement at a frequency of SSB 1.

A network may perform switching between BWPs at which the UE works. For example, a BWP at which the UE performs reception is switched to BWP 2 (or referred to as a second BWP or 2-nd BWP). SSB 1 (namely, the cell defining SSB of the UE) is not included in a frequency range of BWP 2. Strictly, SSB #2 included in the frequency range is an SSB of another cell, because the UE fails to determine the following:

(1) whether SSBs at the frequency position include an SSB transmitted by a base station transmitting SSB #1; and (2) whether measurement for another intra-frequency cell can be performed at the frequency position as same as a position of SSB #1.

Therefore, the UE fails to directly perform SSB-based measurement at the frequency position. In this case, any one or more of embodiments 1 to 4 can be selected and performed.

Embodiment 1

The network may deliver indication information. The indication information indicates whether the UE can perform serving cell measurement at a frequency of another SSB. Therefore, in a case that the UE is switched to a BWP that does not include SSB #1, another SSB can be used for the measurement.

In a case that SSBs at the frequency position include a second SSB transmitted by the base station transmitting SSB #1, the UE can perform the serving cell measurement based on the second SSB, or the measurement further includes intra-frequency neighboring cell measurement at the frequency.

Further, the network may also indicate, via the indication information, whether SSB-based intra-frequency neighboring cell measurement can be performed at the frequency. After receiving the indication information, the UE can perform the intra-frequency neighboring cell measurement at the frequency.

Further, the indication information may be transmitted via higher layer signaling.

Embodiment 2

The network may indicate, via the DCI, whether the UE can perform the serving cell measurement and/or the intra-frequency neighboring cell measurement at the frequency.

For example, DCI indicating BWP switching is performed also indicates that the serving cell measurement and/or the intra-frequency neighboring cell measurement are performed.

Embodiment 3

The network performs indication of the serving cell measurement and/or the intra-frequency neighboring cell measurement in a non-explicit (implicit) manner. In a current Rel-15 protocol, QCL indication of SSBs at different frequencies is not supported.

Further, the network may indicate a QCL relationship among SSBs at different frequency positions. In a case that the UE receives QCL indication for SSBs at two frequency positions, the UE may use a measurement result of an SSB at any of the frequency positions as a link measurement result of the serving cell. Further, the UE may perform intra-frequency measurement at the frequency.

Embodiment 4

After switching to the frequency position of the second SSB for the measurement, the UE performs the following a or b:

a) In a case that the measurement is RRM measurement, the UE performs one or more of the following:

i. The UE performs L3 filtering based on both a measurement result of the second SSB and a measurement result of the first SSB, to obtain an L3-RRM measurement result.

ii. The UE discards a measurement result of the first SSB, and performs L3 filtering based on a measurement result of the second SSB, to obtain an L3-RRM measurement result.

b) In a case that the measurement is measurement for cell or beam radio link monitoring, the UE performs one or more of the following:

i. The UE continues using a currently running counter or timer.

ii. The UE restarts a current counter or timer.

Further, the measurement result includes one or more of the following: reference signal receiving power (RSRP), reference signal receiving quality (RSRQ), a received signal strength indicator (RSSI), a signal to interference plus noise ratio (SINR), or the like.

Further, the counter for radio link quality of the cell is an n310 or n311 counter; and the timer is a T310 or T311 timer.

Further, the counter for radio link quality of the beam is a counter for beam failure detection; and the timer is a timer for beam failure detection.

An embodiment of the present disclosure further provides a terminal. A principle of solving a problem by the terminal is similar to that of the measurement method in the embodiments of the present disclosure. Therefore, for implementation of the terminal, reference may be made to the implementation of the method, and details are not repeated again.

Figure 5:
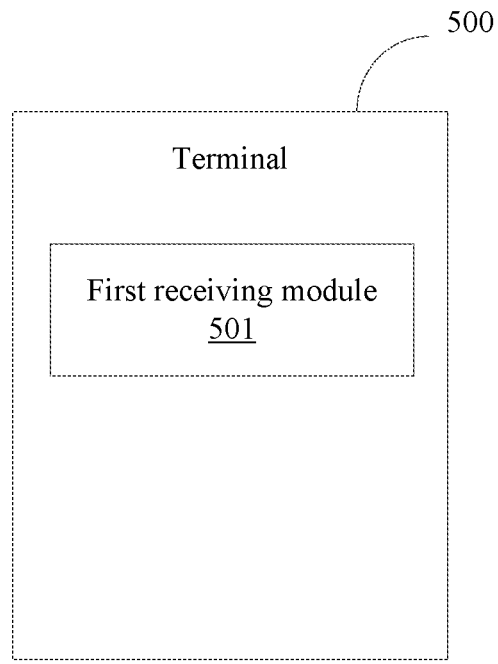
FIG. 5 is a schematic diagram of a terminal according to an embodiment of the present disclosure.

Referring to FIG. 5, an embodiment of the present disclosure further provides a terminal. The terminal 500 includes a first receiving module 501. The first receiving module 501 is configured to receive indication information, where the indication information indicates whether the terminal can perform measurement at one or more second SSBs, a frequency position of the second SSB is different from a frequency position of a first SSB, and the first SSB is an SSB for measurement of a serving cell.

In some implementations, the indication information includes a QCL relationship between the second SSB and the first SSB. The QCL relationship between the second SSB and the first SSB implicitly indicates that the terminal can perform the measurement on the one or more second SSBs.

It may be understood that the indication information may explicitly or implicitly indicate whether the terminal can perform the measurement on the one or more second SSBs.

In some implementations, the indication information is received via higher layer signaling, a first MAC-CE, or first DCI. Further, the first DCI is DCI indicating that the terminal switches between BWPs; and/or the first MAC-CE is an MAC-CE indicating an activated Scell of the terminal.

In some implementations, the measurement on the one or more second SSBs includes: measurement of a serving cell on the one or more second SSBs, or intra-frequency measurement on the one or more second SSBs.

In some implementations, the measurement of the serving cell includes one or more of the following:
(1) RRM measurement of the serving cell;
(2) L1-RSRP measurement of the serving cell; and
(3) measurement for radio link monitoring for a cell or beam of the serving cell.

In some implementations, the intra-frequency measurement includes one or more of the following:
(1) RRM measurement of the serving cell;
(2) cell searching or discovery; and
(3) RRM measurement of a non-serving cell.

In some implementations, measurement configuration of the second SSB is the same as measurement configuration of the first SSB. In other words, in the embodiments of the present disclosure, there may be no explicit configuration of the second SSB. When the terminal receives the indication information, it is assumed that the configuration of the second SSB is the same as the configuration of the first SSB.

In some implementations, the first receiving module 501 is further configured to receive measurement configuration of the second SSB, for example, receiving the measurement configuration of the second SSB via higher layer signaling; receiving the measurement configuration of the second SSB via a second MAC-CE; or receiving the measurement configuration of the second SSB via second DCI.

Further, the second DCI is DCI indicating that the terminal switches between BWPs; and/or the second MAC-CE is an MAC-CE indicating an activated Scell of the terminal.

In some implementations, the measurement configuration of the second SSB may include one or more of the following:
(1) SMTC;
(2) SSB index configuration for transmitting an SSB; and
(3) SSB power configuration.

In some implementations, the measurement configuration of the second SSB includes one or more of the following:
(1) an SSB index for detecting link quality;
(2) a measurement period;
(3) a parameter of a timer or counter for radio link failure; and
(4) a parameter of a counter or timer for beam failure detection.

In some implementations, in a case that the second SSB is within the BWP of the terminal, where the indication information indicates whether the terminal can perform the measurement on the one or more second SSBs.

In some implementations, the terminal 500 further includes a first measurement module. The first measurement module is configured to: in a case that the activated BWP of the terminal includes the first SSB and the second SSB, perform the measurement at the frequency position of the first SSB and the frequency position of the second SSB respectively, to obtain a first measured value and a second measured value; and perform filtering on the first measured value and the second measured value, to obtain a joint measured value.

In some implementations, the terminal 500 further includes a second measurement module. The second measurement module is configured to: in a case that the indication information indicates that the terminal can perform the measurement on the one or more second SSBs, switch to the frequency position of the second SSB for the measurement.

In some implementations, after the terminal switches to the frequency position of the second SSB for measurement, the second measurement module is further configured to: in a case that the measurement includes the RRM measurement of the serving cell and/or the RRM measurement of the non-serving cell, perform one or more of the following:
(1) perform L3 filtering based on a measurement result of the second SSB and a measurement result of the first SSB, to obtain an L3-RRM measurement result; or
(2) discard a measurement result of the first SSB, and perform L3 filtering based on a measurement result of the second SSB, to obtain an L3-RRM measurement result.

In some implementations, after the terminal switches to the frequency position of the second SSB for the measurement, the second measurement module is further configured to: in a case that the measurement includes the measurement for the radio link monitoring for the cell or beam of the serving cell, perform one or more of the following:
(1) continue using a currently running counter or timer; or
(2) restart a current counter or timer.

In some implementations, the terminal 500 further includes a first sending module. The first sending module is configured to report a measurement capability of the terminal, where the measurement capability includes: a quantity of frequencies of SSBs at which RRM measurement is performed in a receiving bandwidth of the terminal, and/or a quantity of frequencies of SSBs at which cell searching is performed in the receiving bandwidth of the terminal.

The terminal provided in this embodiment of the present disclosure may perform the foregoing embodiment shown in FIG. 2. An implementation principle and a technical effect of the terminal are similar to those of the method embodiment, and details are not described again in this embodiment.

An embodiment of the present disclosure further provides a network device. Because a problem resolving principle of the network device is similar to that of the measurement indication method in the embodiments of the present disclosure, for implementation of the network device, reference may be made to implementation of the method, and repeated parts are not described.

Figure 6:
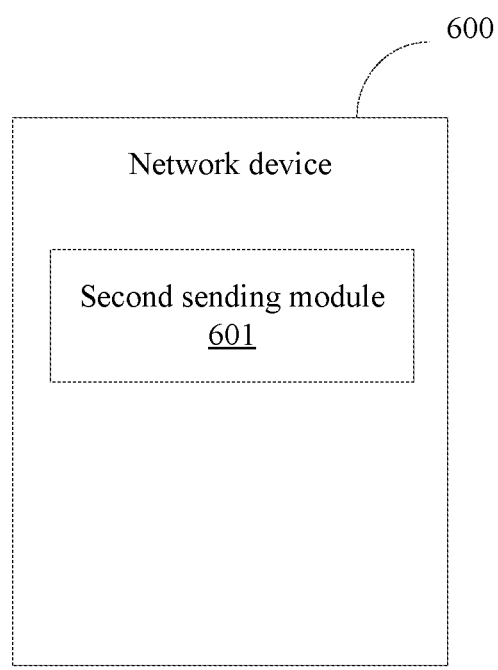
FIG. 6 is a schematic diagram of a network device according to an embodiment of the present disclosure.

Referring to FIG. 6, an embodiment of the present disclosure further provides a network device. The network device 600 includes a second sending module 601. The second sending module 601 is configured to send indication information, where the indication information indicates whether a terminal can perform measurement at one or more second SSBs, a frequency position of the second SSB is different from a frequency position of a first SSB, and the first SSB is an SSB for measurement of a serving cell.

In some implementations, the indication information includes a QCL relationship between the second SSB and the first SSB. The QCL relationship between the second SSB and the first SSB implicitly indicates that the terminal can perform the measurement on the one or more second SSBs.

In some implementations, the second sending module 601 is further configured to send the indication information via higher layer signaling, a first MAC-CE, or first DCI. Further, the first DCI is DCI indicating that the terminal switches between BWPs; and/or the first MAC-CE is an MAC-CE indicating an activated Scell of the terminal.

In some implementations, the measurement on the one or more second SSBs includes: measurement of a serving cell on the one or more second SSBs, or intra-frequency measurement on the one or more second SSBs.

In some implementations, the measurement of the serving cell includes one or more of the following:
(1) RRM measurement of the serving cell;
(2) L1-RSRP measurement of the serving cell; and
(3) measurement for radio link monitoring for a cell or beam of the serving cell.

In some implementations, the intra-frequency measurement includes one or more of the following:
(1) RRM measurement of the serving cell;
(2) cell searching or discovery; and
(3) RRM measurement of a non-serving cell.

In some implementations, measurement configuration of the second SSB is the same as measurement configuration of the first SSB. In other words, in the embodiments of the present disclosure, there may be no explicit configuration of the second SSB. When the terminal receives the indication information, it is assumed that the configuration of the second SSB is the same as the configuration of the first SSB.

In some implementations, the network device 600 further includes a third sending module, configured to send measurement configuration of the second SSB, for example, send the measurement configuration of the second SSB via higher layer signaling; send the measurement configuration of the second SSB via a second MAC-CE; or send the measurement configuration of the second SSB via second DCI. Further, the second DCI is DCI indicating that the terminal switches between BWPs; and/or the second MAC-CE is an MAC-CE indicating an activated Scell of the terminal.

In some implementations, the measurement configuration of the second SSB may include one or more of the following:
(1) SMTC;
(2) SSB index configuration for transmitting an SSB; and
(3) SSB power configuration.

In some implementations, the measurement configuration of the second SSB includes one or more of the following:
(1) an SSB index for detecting link quality;
(2) a measurement period;
(3) a parameter of a timer or counter for radio link failure; and
(4) a parameter of a counter or timer for beam failure detection.

In some implementations, in a case that the second SSB is within the BWP of the terminal, where the indication information indicates whether the terminal can perform the measurement on the one or more second SSBs.

In some implementations, the network device 600 further includes a second receiving module, configured to receive a measurement capability of the terminal, where the measurement capability includes: a quantity of frequencies of SSBs at which RRM measurement is performed in a receiving bandwidth of the terminal, and/or a quantity of frequencies of SSBs at which cell searching is performed in the receiving bandwidth of the terminal.

The network device provided in this embodiment of the present disclosure may perform the foregoing embodiment shown in FIG. 3. An implementation principle and a technical effect of the network device are similar to those of the method embodiment, and details are not described again in this embodiment.

Figure 7:
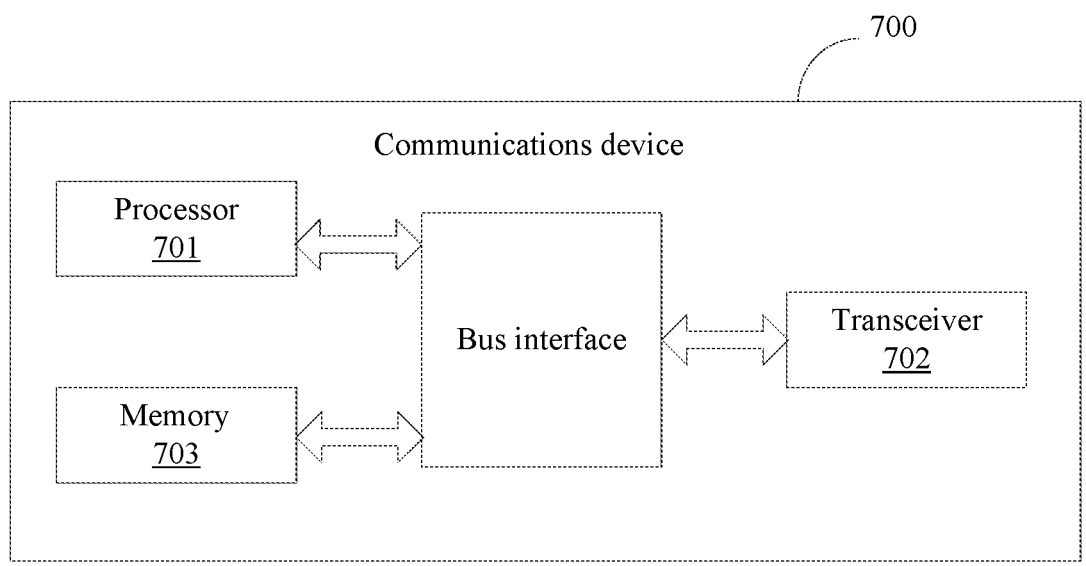
FIG. 7 is a schematic diagram of a communications device according to an embodiment of the present disclosure.

Referring to FIG. 7, FIG. 7 is a structural diagram of a communications device applied in an embodiment of the present disclosure. As shown in FIG. 7, the communications device 700 includes: a processor 701, a transceiver 702, a memory 703, and a bus interface, where the processor 701 may be responsible for bus architecture management and general processing. The memory 703 may store data used by the processor 701 when the processor 701 performs an operation.

In an embodiment of the present disclosure, the network device 700 further includes: a computer program stored in the memory 703 and executable by the processor 701. The computer program, when executed by the processor 701, implements the steps of the methods shown in FIG. 2 and FIG. 3.

In FIG. 7, the bus architecture may include any quantity of interconnected buses and bridges, which are specifically linked together by various circuits of one or more processors represented by the processor 701 and a memory represented by the memory 703. The bus architecture may further link various other circuits such as those of a peripheral device, a voltage regulator, and a power management circuit. These are well known in the art, and therefore are not further described in this specification. The bus interface provides an interface. The transceiver 702 may be a plurality of elements. To be specific, the transceiver 702 includes a transmitter and a receiver, and provides a unit configured to communicate with various other apparatuses on a transmission medium.

The communications device provided in this embodiment of the present disclosure can perform the foregoing method embodiments shown in FIG. 2 and FIG. 3. An implementation principle and a technical effect of the communications device are similar to those of the method embodiments, and details are not described again in this embodiment.

The methods or algorithm steps described with reference to content of the present disclosure may be implemented by using hardware, or may be implemented in a manner in which the processor executes a software instruction. The software instruction may be formed by a corresponding software module. The software module may be stored in a random access memory (RAM), a flash memory, a memory (ROM), and an erasable programmable read-only memory (EPROM), an electrically erasable programmable read-only memory (EEPROM), a register, a hard disk, a mobile hard disk, a compact disc read-only memory, or a storage medium of any other form known in the art. An exemplary storage medium is coupled to the processor, so that the processor can read information from the storage medium and can write information to the storage medium. Certainly, the storage medium may also be a component of the processor. The processor and the storage medium may be carried in an application specific integrated circuit (ASIC). In addition, the ASIC may be carried in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any usable medium accessible to a general-purpose or special-purpose computer.

The objectives, technical solutions, and beneficial effects of the present disclosure are further described in detail in the foregoing specific implementations. It should be understood that the foregoing descriptions are merely specific embodiments of the present disclosure, but are not intended to limit the protection scope of the present disclosure. Any modification, equivalent replacement, improvement, or the like made on a basis of the technical solutions of the present disclosure shall fall within the protection scope of the present disclosure.

A person skilled in the art should understand that the embodiments of the present disclosure can be provided as a method, a system, or a computer program product. Therefore, the embodiments of the present disclosure may be complete hardware embodiments, complete software embodiments, or software-hardware combined embodiments. Moreover, the embodiments of the present disclosure may use a form of a computer program product that is implemented on one or more computer-usable storage media (including but are not limited to a magnetic disk memory, a CD-ROM, an optical memory, and the like) that include computer-usable program code.

The embodiments of the present disclosure are described with reference to the flowcharts and/or block diagrams of the method, the device (system), and the computer program product according to the embodiments of the present disclosure. It should be understood that each process and/or block in the flowchart and/or block diagram as well as a combination of processes and/or blocks in the flowchart and/or block diagram may be implemented by computer program instructions. These computer program instructions can be provided to a general-purpose computer, a special-purpose computer, an embedded processor, or a processor of another programmable data processing device to generate a machine, so that an apparatus configured to implement functions specified in one or more procedures of a flowchart and/or one or more blocks of a block diagram is generated by using the instructions executed by the computer or the processor of the another programmable data processing device.

These computer program instructions can also be stored in a computer-readable memory that can instruct a computer or another programmable data processing device to work in a specific manner, so that an instruction stored in the computer-readable memory generates a product including an instruction apparatus, and the instruction apparatus implements a function specified in one or more processes of the flowchart and/or one or more blocks of the block diagram.

These computer program instructions can also be loaded into a computer or another programmable data processing device, so that a series of operation steps are executed by the computer or the another programmable device to generate processing implemented by the computer, and the instruction executed on the computer or the another programmable device provides steps of functions specified in one or more procedures of a flowchart and/or one or more blocks of a block diagram.

Obviously, a person skilled in the art can make various modifications and variations to the embodiments of the present disclosure without departing from the spirit and scope of the present disclosure. In this way, the present disclosure is intended to include these modifications and variations of the embodiments of the present disclosure provided that they fall within the scope of the claims of the present disclosure and their equivalent technologies.

What is claimed is:

1. A measurement indication method, comprising:
   receiving, by a terminal, indication information, wherein the indication information indicates whether the terminal can perform measurement on one or more second Synchronization Signal and Physical Broadcast Channel (PBCH) blocks (SSBs), wherein
   a frequency position of the one or more second SSBs is different from a frequency position of a first SSB, and the first SSB is an SSB for measurement of a serving cell, wherein the first SSB is a cell defining SSB, and the second SSB is a non-cell defining SSB;
   wherein the first SSB is not explicitly configured, measurement configuration of the first SSB is by default the same as measurement configuration of the second SSB, and the measurement configuration of the second SSB comprises one or more of:
   SSB-based RRM measurement timing configuration (SMTC); and
   SSB index configuration for transmitting an SSB.

2. The method according to claim 1, wherein
   the indication information comprises: a quasi co-located (QCL) relationship between the second SSB and the first SSB, wherein the QCL relationship between the second SSB and the first SSB indicates that the terminal can perform the measurement on the one or more second SSBs.

3. The method according to claim 1, wherein performing the measurement on the one or more second SSBs comprises: performing measurement of a serving cell on the one or more second SSBs, or performing intra-frequency measurement on the one or more second SSBs.

4. The method according to claim 3, wherein
   the measurement of the serving cell comprises one or more of the following:
   radio resource management (RRM) measurement of the serving cell;
   layer 1-reference signal received power (L1-RSRP) measurement of the serving cell; and
   measurement for radio link monitoring for a cell or beam of the serving cell;
   or
   the intra-frequency measurement comprises one or more of the following:
   RRM measurement of the serving cell;
   cell searching or discovery; and
   RRM measurement of a non-serving cell.

5. The method according to claim 1, further comprising:
   in a case that the activated BWP of the terminal comprises the first SSB and the second SSB, performing, by the terminal, the measurement at the frequency position of the first SSB and the frequency position of the second SSB respectively, to obtain a first measured value and a second measured value; and
   performing, by the terminal, filtering on the first measured value and the second measured value, to obtain a joint measured value.

6. The method according to claim 1, wherein the method further comprises:
   in a case that the indication information indicates that the terminal can perform the measurement on the one or more second SSBs, switching, by the terminal, to the frequency position of the second SSB for the measurement.

7. The method according to claim 6, wherein after the switching, by the terminal, to the frequency position of the second SSB for the measurement, the method further comprises:
   in a case that the measurement comprises the RRM measurement of the serving cell and/or the RRM measurement of the non-serving cell, performing one or more of the following:

performing, by the terminal, layer 3 (L3) filtering based on a measurement result of the second SSB and a measurement result of the first SSB, to obtain an L3-RRM measurement result; or discarding, by the terminal, a measurement result of the first SSB, and performing L3 filtering based on a measurement result of the second SSB, to obtain an L3-RRM measurement result;

or in a case that the measurement comprises the measurement for the radio link monitoring for the cell or beam of the serving cell, performing one or more of the following:

continuing, by the terminal, using a currently running counter or timer; or restarting, by the terminal, a current counter or timer.

8. The method according to claim 1, wherein the method further comprises:

reporting, by the terminal, a measurement capability of the terminal, wherein the measurement capability comprises: a quantity of frequencies of SSBs at which RRM measurement is performed in a receiving bandwidth of the terminal, and/or a quantity of frequencies of SSBs at which cell searching is performed in the receiving bandwidth of the terminal.

9. The method according to claim 1, wherein measurement configuration of the second SSB further comprises:

SSB power configuration.

10. A terminal, comprising a processor, a memory, and a program stored in the memory and executable by the processor, wherein the program, when executed by the processor causes the terminal to receive indication information, wherein the indication information indicates whether the terminal can perform measurement on one or more second Synchronization Signal and Physical Broadcast Channel (PBCH) blocks (SSBs), wherein a frequency position of the one or more second SSBs is different from a frequency position of a first SSB, and the first SSB is an SSB for measurement of a serving cell, wherein the first SSB is a cell defining SSB, and the second SSB is a non-cell defining SSB;

wherein the first SSB is not explicitly configured, measurement configuration of the first SSB is by default the same as measurement configuration of the second SSB, and the measurement configuration of the second SSB comprises one or more of:

SSB-based RRM measurement timing configuration (SMTC); and

SSB index configuration for transmitting an SSB.

11. The terminal according to claim 10, wherein the indication information comprises: a quasi co-located (QCL) relationship between the second SSB and the first SSB, wherein the QCL relationship between the second SSB and the first SSB indicates that the terminal can perform the measurement on the one or more second SSBs.

12. The terminal according to claim 10, wherein performing the measurement on the one or more second SSBs comprises: performing measurement of a serving cell on the one or more second SSBs, or performing intra-frequency measurement on the one or more second SSBs.

13. The terminal according to claim 12, wherein the measurement of the serving cell comprises one or more of the following:

radio resource management (RRM) measurement of the serving cell;

layer 1-reference signal received power (L1-RSRP) measurement of the serving cell; and measurement for radio link monitoring for a cell or beam of the serving cell;

or the intra-frequency measurement comprises one or more of the following:

RRM measurement of the serving cell;

cell searching or discovery; and

RRM measurement of a non-serving cell.

14. The terminal according to claim 10, wherein the program, when executed by the processor, causes the terminal to:

report a measurement capability of the terminal, wherein the measurement capability comprises: a quantity of frequencies of SSBs at which RRM measurement is performed in a receiving bandwidth of the terminal, and/or a quantity of frequencies of SSBs at which cell searching is performed in the receiving bandwidth of the terminal.

15. A network device, comprising a processor, a memory, and a program stored in the memory and executable by the processor, wherein the program, when executed by the processor causes the network device to send indication information, wherein the indication information indicates whether a terminal can perform measurement at one or more second Synchronization Signal and Physical Broadcast Channel (PBCH) blocks (SSBs), wherein a frequency position of the one or more second SSBs is different from a frequency position of a first SSB, and the first SSB is an SSB for measurement of a serving cell, wherein the first SSB is a cell defining SSB, and the second SSB is a non-cell defining SSB;

wherein the first SSB is not explicitly configured, measurement configuration of the first SSB is by default the same as measurement configuration of the second SSB, and the measurement configuration of the second SSB comprises one or more of:

SSB-based RRM measurement timing configuration (SMTC); and

SSB index configuration for transmitting an SSB.

16. The network device according to claim 15, wherein the indication information comprises: a quasi co-located (QCL) relationship between the second SSB and the first SSB, wherein the QCL relationship between the second SSB and the first SSB indicates that the terminal can perform the measurement on the one or more second SSBs.

17. The network device according to claim 15, wherein performing the measurement on the one or more second SSBs comprises: performing measurement of a serving cell on the one or more second SSBs, or performing intra-frequency measurement on the one or more second SSBs.

18. The network device according to claim 17, wherein the measurement of the serving cell comprises one or more of the following:

radio resource management (RRM) measurement of the serving cell;

layer 1-reference signal received power (L1-RSRP) measurement of the serving cell; and measurement for radio link monitoring for a cell or beam of the serving cell;

or the intra-frequency measurement comprises one or more of the following:

RRM measurement of the serving cell;

cell searching or discovery; and

RRM measurement of a non-serving cell.

19. The network device according to claim 15, wherein the program, when executed by the processor causes the network device to
receive a measurement capability of the terminal, wherein the measurement capability comprises: a quantity of frequencies of SSBs at which RRM measurement is performed in a receiving bandwidth of the terminal, and/or a quantity of frequencies of SSBs at which cell searching is performed in the receiving bandwidth of the terminal.

* * * * *